Oct. 8, 1940.  S. C. HETH  2,217,590

THRASHING ELEMENT

Filed April 9, 1937

INVENTOR.
Sherman C. Heth
BY James A. Walsh,
ATTORNEY

Patented Oct. 8, 1940

2,217,590

UNITED STATES PATENT OFFICE 2,217,590

THRASHING ELEMENT

Sherman C. Heth, Sturtevant, Wis., assignor to J. I. Case Company, Racine, Wis., a corporation Application April 9, 1937, Serial No. 135,832

4 Claims. (Cl. 130—27)

The present invention relates to thrashing machines, and an object thereof is to generally improve the construction and operation of devices of this class.

A further object is to provide an improved construction of cylinder and concave for a thrashing machine.

More particularly, an object is to provide improved thrashing elements for a cylinder and concave.

Further objects are to provide a cylinder, portions of which are adjustable for most effective action on different kinds of material; to provide a concave having parts which are adjustable for cooperation in various ways with the thrashing elements of a cylinder; to provide suitable anchoring means whereby the rapidly moving parts can be made adjustable without introducing liability of such parts shifting during operation, or, under any circumstances, coming into contact with stationary parts.

Other objects and advantages will become apparent from the following description and accompanying drawing, in which.

Figure 1:
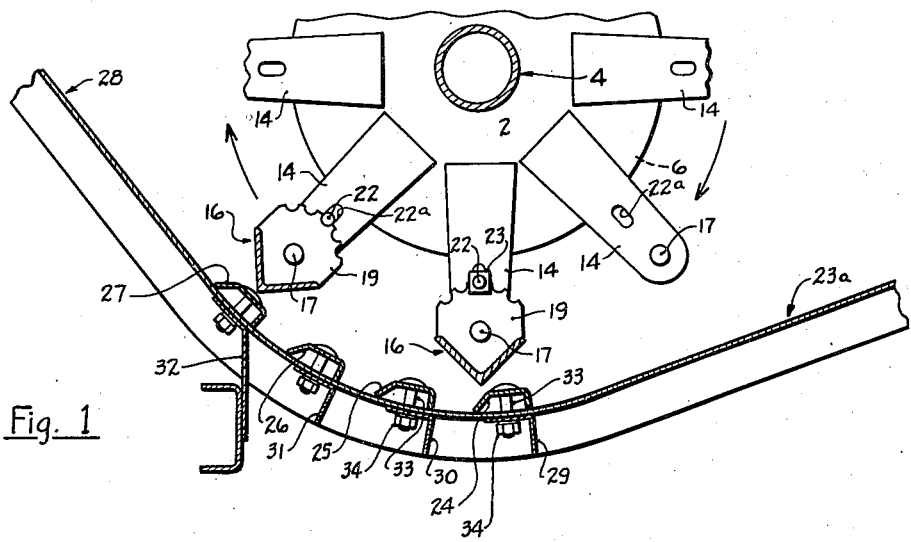
Figure 1 is a vertical sectional view of a cylinder and concave embodying the invention.
Figure 2:
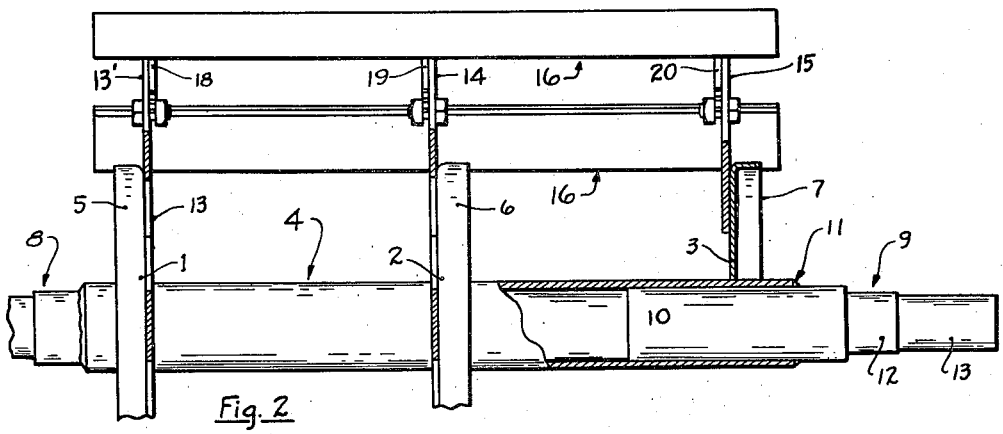
Fig. 2 is a fragmentary front elevation of a cylinder embodying the invention, with parts broken away and others in section, to show interior features.

As seen in Figs. 1 and 2, the cylinder comprises a series of spiders or disks 1, 2 and 3, supported in alignment as by a shaft generally designated as 4, the disks being provided with flange portions 5, 6 and 7, respectively, for stiffening them and providing a solid foundation for the remaining parts of the cylinder. Shaft 4 is made hollow for maximum stiffness without excess weight, although other means are contemplated for holding the disks in alignment and providing a structure rugged enough to serve as a cylinder, and journal portions or gudgeons generally designated as 8 and 9 are fixed with the ends of shaft 4, in the present instance the gudgeons having shank portions as 10, which, for example, may be forced into the ends of shaft 4 under substantial pressure and then welded in place at 11 so that the hollow shaft and its solid ends are in effect one piece and amply strong for the purpose intended. Other means of making the shaft are known, however, and it is not intended by this description to limit the invention to the structure shown or in fact in any manner except as defined in the claims.

The gudgeons are provided with journal portions such as 12 which may engage and be supported in anti-friction bearings in suitable or well-known manner, and at least one of them will preferably have a pulley carrying extension 13.

Disks 1, 2 and 3 are suitably fixed with shaft 4, conveniently by welding, and have a plurality of arms 13'—13', 14—14 and 15—15, respectively, extending outwardly for carrying the thrashing elements. The latter may be of various forms, in the present instance comprising angle bars generally designated as 16—16 arranged substantially parallel with the shaft 4.

Arms 13', 14, 15 are suitably fixed with the disks as by spot-welding, although other methods are contemplated as equivalent, and at their outer ends are apertured for the reception of pivots 17—17. The latter engage ears 18, 19 and 20 projecting inwardly from bars 16 and fixed therewith in any suitable manner, as by welding, the ears and pivots serving to secure bars 16 to the arms 13', 14 and 15 in a manner such that the bars can be shifted about the pivots, but without danger of their being dislodged from the arms by rotation of the cylinder or impact with any objects likely to be encountered.

As shown particularly in Fig. 1, the ears extend inwardly from the pivots 17 and comprise sector portions having notches, openings or the like 21—21 which may be engaged by a bolt 22 passing through a slot 22ª in the adjacent arm and having a nut 23 or other suitable fastening means arranged for clamping the ear into forcible contact with the arm. By loosening the nuts on all the bolts controlling one of the bars 16 and shifting the bolts in the slots 22ª out of engagement with the notches 21—21, it is possible to rock the bar into any of a variety of positions and lock it therein by replacing the bolts in new openings. It is thus possible to vary the type of surface presented toward the material being thrashed, in the embodiment disclosed, all the way from that of a narrow edge portion of the bar 16 to the full width of one of the sides of the bar, the flat sides being capable of presentation at various angles to the line of travel of the bar. It is thus possible to set the bars for operation to the best advantage upon the crop at hand.

While ordinarily all the bars on the cylinder will be set in the same position, it is possible to set the different bars in different positions in the event that this should be desirable for any reason.

The cylinder above described will be useful with various types of concaves, and it is not intended to limit the invention to use in any particular combination, but this cylinder is particularly advantageous for use in an arrangement such as disclosed in the co-pending application of Sherman C. Heth and William B. Tallman, Serial No. 130,257, filed March 11, 1937, for Combination harvester-thrashers.

Material to be thrashed, as disclosed in the above identified application, is urged along a platform 23ª, Fig. 1, and is engaged by the bars 16 on the cylinder and thrashed between them and a plurality of preferably substantially U-shaped bars 24—25—26 and 27, fixed on a curved portion of platform 23ª in position to be closely approached by bars 16, both the grain and the straw passing entirely through between the bars 24, etc., and the bars 16 and being thrown forcibly up the inclined thrashing floor 28 to the separator elements (not shown) and forming no part of the present invention.

It is contemplated that openings may be provided when desired between bars 24—25—26 and 27, and in floor 28, and in fact wherever desirable to permit the escape of grain from the concave in the manner common to the usual type of machine without passing over all of the concave bars.

To provide for flexibility in the arrangement of these bars, they are preferably made of irregular cross-section, in the illustrative embodiment being of channel section with one of the channel walls outwardly inclined, as clearly shown in the various views of the drawing.

Figure 3:
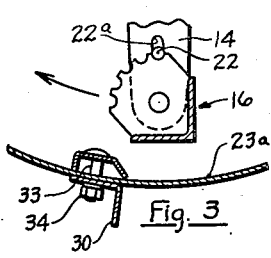
Figs. 3, 4 and 5 are enlarged details of certain structure shown in Fig. 1, showing the parts in various adjustments.
Figure 4:
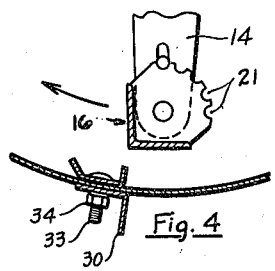
Figure 5:
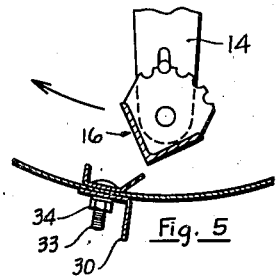

The bars are disposed, in the present instance, substantially parallel to bars 16 of the cylinder and also to shaft 4 and they may be placed in the concave in any position, for example as shown in Figs. 1 and 5, or, by turning end-for-end, in those shown in Figs. 3 and 4. A variety of different surfaces are therefore available for presentation to the material being thrashed, and it is often desirable to put the successive bars 24, 25, 26 and 27 in different positions in a single setting of the machine.

The bars may be held in place in various ways, for example, in the present instance they are located substantially opposite to frame members 29, 30, 31 and 32, constituting part of the concave, and each bar is provided with a plurality of bolts 33—33 extending through it and the adjacent frame member to hold the bar in place. As many of these bolts may be provided within the length of the bar as may be necessary to hold it in place in opposition to the considerable tendency toward displacement obtaining when the cylinder is in operation. Bolts 33 are provided with nuts 34 for clamping the members securely together.

Figure 6:
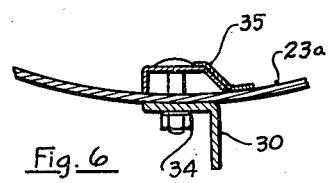
Figs. 6 and 7 are similar views showing a modified arrangement for attaching concave bars.
Figure 7:
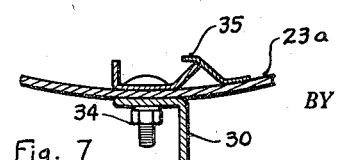

An alternative manner of holding the bars is illustrated in Figs. 6 and 7. In this arrangement a strip or bar 35 of suitable cross section is permanently fixed with the bottom 23ª of the concave, as by welding, the leading edges of the concave bars 24 to 27 being introduced beneath these strips, which shield the concave bars from the direct displacing effect of the material being thrashed. By virtue of this shielding effect it is possible to largely reduce the number of bolts 33 necessary to hold the concave bars in place, and accordingly to reduce to a large extent the time required to change the concave from one adjustment to another.

Figs. 3, 4 and 5 show several of the possible adjusted positions of the bars 16, Fig. 3 illustrating the presentation of the narrow edge portion of one of the bars to the material, the arrow showing the direction of motion of the bar, Fig. 4 showing the presentation of the broad side of one of the bars, and Fig. 5 showing the presentation of one of the broad sides at a slight angle.

The operation of the invention is thought to be clear from the above description, the cylinder being rotated in the usual or a suitable manner in close proximity to the concave bars 24, 25, 26, and 27, and the material to be thrashed being fed over the platform 23ª into the space between the cylinder and the concave, where it is beaten by the bars 16 and against the bars 24, 25, 26 and 27 and the grain thrashed from the straw. If conditions are such that the material is difficult to thrash, the cylinder bars may be set as in Fig. 3, while the concave bars are set as in Figs. 4 or 5, while, if the material thrashes easily, the cylinder bars will be set as in Figs. 1, 4, or 5, and the concave bars as in Fig. 1 or Fig. 3. It is not intended, however, to limit the invention to these combinations of settings, and other combinations will probably be found more suitable for specific conditions, the combinations suggested being illustrative merely.

The above being a full and complete description of an illustrative embodiment of the invention, what is claimed as new and desired to be secured by Letters Patent of the United States is:

1. In a thrashing machine a concave including a curved imperforate thrashing floor and a thrashing-bar on the floor comprising a channel bar having a back and upstanding walls, one wall thereof upstanding from said back at an oblique angle thereto, the other wall upstanding perpendicular to said back, and means for fixing said bar on said floor in various positions including positions with its concave side presented to material being thrashed, with its convex side so presented, and in end-to-end reversed relation in either of the above positions.

2. In a thrashing machine an upwardly concave thrashing floor of thin sheet metal, frame members beneath the floor at spaced intervals for stiffening the latter, a plurality of thrashing bars on the floor substantially opposite said frame members, certain of said bars comprising a channel bar having a back and upstanding walls, one wall thereof upstanding from the back and outwardly inclined at an oblique angle thereto, and the other wall upstanding perpendicular to said back, and means for fixing said bars, said floor and said frame members together in various positions including such positions that said channel bar presents its concave side, or its convex side to material being thrashed, or in end-to-end reversed relation to either of the above positions.

3. In a thrashing cylinder a shaft, a plurality of disks on the shaft, arms rigidly fixed with the disks and extending substantially radially therefrom, ears having rivets extending therethrough and through the ends of the arms for permanently pivoting the ears to the arms, and a plurality of angle irons extending lengthwise of the cylinder and forming thrashing elements, said angle irons being permanently fixed with said ears whereby to present different types of faces to material being thrashed as said ears are shifted about said pivots, notches in said ears, and slots in the arms, and bolts in the slots and adapted to be engaged in the notches for holding the ears in various adjusted positions.

4. In a thrashing machine a cylinder and a concave including a body portion, a thrashing bar on the body portion comprising a channel bar including a back and walls, one of said walls upstanding from the back at an oblique angle thereto and the other wall upstanding from the back substantially perpendicular thereto, a shielding bar permanently fixed to the body portion and upstanding therefrom at an angle substantially complementary to that at which the angular wall extends from the back portion of said thrashing bar, and sloping in the direction of movement of material passing over the body portion, the parts being so proportioned that said thrashing bar may be fitted behind said shielding bar in various positions, and fastening means for holding said thrashing bar in place behind said shielding bar.

SHERMAN C. HETH.